Aug. 18, 1925.
W. BERSSENBRUGGE
1,550,238
TABLE CONSTRUCTION
Filed March 3, 1925
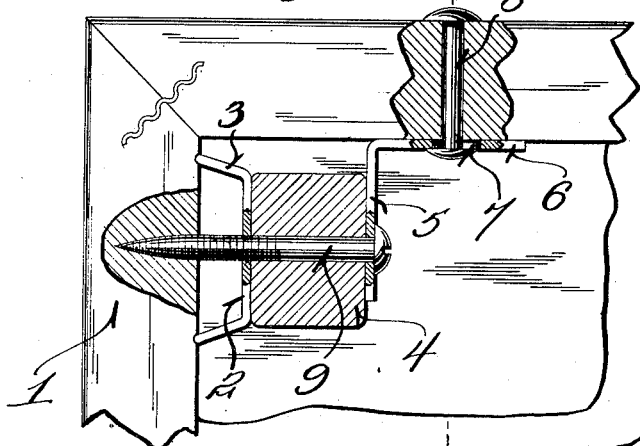
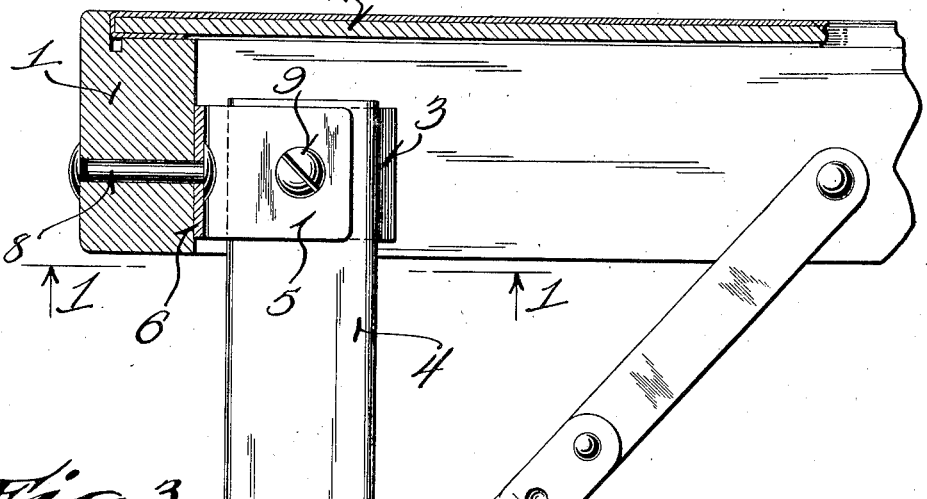
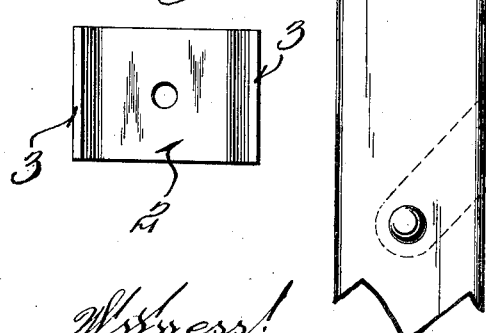
Inventor
William Berssenbrugge Patented Aug. 18, 1925.

1,550,238

UNITED STATES PATENT OFFICE.

WILLIAM BERSSENBRUGGE, OF MILWAUKEE, WISCONSIN, ASSIGNOR TO JOYLAND MANUFACTURING CO., OF MILWAUKEE, WISCONSIN.

TABLE CONSTRUCTION.

Application filed March 3, 1925. Serial No. 12,879.

*To all whom it may concern:*

Be it known that I, WILLIAM BERSSENBRUGGE, a citizen of the United States, and resident of Milwaukee, in the county of Milwaukee and State of Wisconsin, have invented certain new and useful Improvements in Table Constructions; and I do hereby declare that the following is a full, clear, and exact description thereof.

This invention relates to a table construction, and is particularly directed to a construction primarily adapted for light tables provided with folding legs such for instance as the usual card tables.

In card tables and others of this general type, it has been found that the legs which are pivotally carried by the rim of the body portion quickly loosen and give considerable trouble both in their manipulation and in the service rendered. For example, the tables soon become wabbly and shaky and are necessarily discarded for new tables. This invention is designed to overcome such defects, and objects of the invention are to provide a table construction in which provision is made for maintaining the leg in a tight condition at all times irrespective of wear, and to provide means which may be operated by an unskilled person in taking up any wear that may occur.

Further objects are to provide a construction for the pivoted leg of a table which will insure a firm and accurate pivot point for the leg, and which will yieldingly grip the leg between metallic faces to thus insure proper guiding and holding thereof.

An embodiment of the invention is shown in the accompanying drawings, in which:—

Figure 1 is a view from the under side of a corner of a table, such view being taken on the line 1—1 of Figure 2.

Figure 2 is a transverse sectional view on the line 2—2 of Figure 1.

Figure 3 is a detail of the outer bearing clip.

The table comprises the usual heavy rim 1 and light top 2 although, obviously, other types of body construction could be employed. A clip of flattened U-shape is provided for the outer side of each of the legs. This clip comprises a transverse yoke portion 2 equipped with outwardly slanting or divergent legs 3 which are adapted to engage the inner face of the rim 1. The leg 4 is positioned in contact with the yoke 2 of the clip and a second clip is provided on the inner side of the leg. This second clip is formed of a right angle bracket and comprises a bearing member 5 contacting with the outer side of the leg, and a second bearing member 6 which contacts with the inner side of the rim 1. This member 6, it will be noted, contacts with that portion of the rim which is at right angles to the portion with which the legs 3 of the first clip contact. The arm 6 of the second bracket is provided with an elongated slot 7. A rivet 8 is passed through the rim and through the elongated slot 7 and is drawn tight.

A pivot screw and attaching screw 9 is passed through the arm 5 of the right angle bracket through the leg 4 and through the U-shaped bracket 2 and is screwed into the rim 1, as shown in Figure 1. This screw thus clamps the leg between the yoke 2 of the outermost bracket and the arm 5 of the right angle bracket.

It is to be noted that the relatively wide spacing of the legs 3 of the U-shaped bracket secure a firm seating of such bracket upon the rim 1 of a table, and also these legs will be found to bite into the rim and aid in attaining a secure hold thereon when the screw 9 is drawn tight.

It is to be noted further that the leg 4 is supported at its inner and outer sides between two brackets and works between metal faces, thus insuring accurate vertical positioning of the leg at all times.

Further, it is to be particularly noted that when wear occurs due to continued use of the table, that the wear may readily be taken up by tapping the right angle bracket to slide it slightly beneath the rivet 8 and thereafter tightening the screw 9. This produces a slight bodily movement of the right angle bracket and a re-clamping of the leg between the arm 5 and the yoke 2 of the brackets.

Thus, it will be seen that a very rigid pivotal construction for table legs has been provided by this invention, and that means are provided which permit the ready and easy taking up of wear, and which secures therefor a very firm and satisfactory pivot joint for the leg at all times.

Although the invention has been described in considerable detail, it is to be understood

I claim:

1. In a table the combination of a marginal rim, a U-shaped bracket having bearing feet contacting with the inner face of said rim, a table leg having one side thereof contacting with said U-shaped bracket, a right angle bracket having one arm contacting with the inner side of said table leg, a screw passing through such arm and said U-shaped bracket and extending into said rim, the other arm of said right angle bracket contacting with an adjacent portion of said rim, and means for binding said last mentioned arm against said rim.

2. In a table the combination of a marginal rim, a U-shaped bracket having bearing feet contacting with the inner face of said rim, a table leg having one side thereof contacting with said U-shaped bracket, a right angle bracket having one arm contacting with the inner side of said table leg, a screw passing through such arm and said U-shaped bracket and extending into said rim, the other arm of said U-shaped bracket having an elongated slot therein, and a rivet passing through such slot and through an adjacent portion of the rim and clamping such arm against said rim.

3. A light table construction comprising a relatively heavy marginal rim having portions arranged at right angles to each other, a relatively light top secured to and carried by said rim, a metal member contacting with a portion of the inner side of said rim adjacent a corner of the table, a second metal member contacting with the portion of the rim arranged at right angles to the first mentioned portion, said second metal member having an arm extending at right angles to the last mentioned portion of said rim, a leg received between said arm and said first mentioned member, and a screw passing through said arm, said leg and said first mentioned member and into the said rim.

4. A light table construction comprising a relatively heavy marginal rim having portions arranged at right angles to each other, a relatively light top secured to and carried by said rim, a metal member contacting with a portion of the inner side of said rim adjacent a corner of the table, a second metal member contacting with a portion of the rim arranged at right angles to the first mentioned portion, said second metal member having an arm extending at right angles to the last mentioned portion of said rim, a leg received within said arm and said first mentioned member, and a screw passing through said arm, said leg and said first mentioned member and into the said rim, said second metal member being adjustable with reference to the adjacent portion of said rim.

In testimony that I claim the foregoing I have hereunto set my hand at Milwaukee, in the county of Milwaukee and State of Wisconsin.

WILLIAM BERSSENBRUGGE.